United States Patent
Kawabata et al.

[11] Patent Number: 5,994,814
[45] Date of Patent: Nov. 30, 1999

[54] RELUCTANCE MOTOR HAVING MAGNETIC POLES FORMED BY LAMINATING STEEL PLATES IN CIRCUMFERENTIAL DIRECTION

[75] Inventors: Yasutomo Kawabata; Tetsuya Miura, both of Aichi-ken; Masaru Hirako, Toyota, all of Japan

[73] Assignee: Toyota Jidosha Kabushiki Kaisha, Toyota, Japan

[21] Appl. No.: 08/888,897

[22] Filed: Jul. 7, 1997

[30] Foreign Application Priority Data

Jul. 8, 1996 [JP] Japan .................................... 8-177856
Nov. 29, 1996 [JP] Japan .................................... 8-318908

[51] Int. Cl.$^6$ .............................. H02K 1/00; H02K 1/04; H02K 19/06
[52] U.S. Cl. .......................... 310/216; 310/258; 310/261; 310/156
[58] Field of Search .................................... 310/162, 163, 310/165, 216, 261, 264, 265, 166, 217, 259

[56] References Cited

U.S. PATENT DOCUMENTS

| | | | |
|---|---|---|---|
| 1,255,607 | 2/1918 | Hensley | 310/216 |
| 3,591,819 | 7/1971 | Laing | 310/217 |
| 3,671,789 | 6/1972 | Menzies | 310/163 |
| 4,110,646 | 8/1978 | Rao | 310/163 |
| 4,249,099 | 2/1981 | Bhongbhibhat et al. | 310/218 |
| 4,255,684 | 3/1981 | Mischler et al. | 310/216 |
| 4,888,513 | 12/1989 | Fratta | 310/116 |
| 5,051,637 | 9/1991 | Harris et al. | 310/90.5 |
| 5,095,237 | 3/1992 | Bardas et al. | 310/90.5 |
| 5,296,773 | 3/1994 | El-Antably et al. | 310/261 |

FOREIGN PATENT DOCUMENTS

| | | |
|---|---|---|
| 63-194546 | 8/1988 | Japan . |
| 2-151249 | 6/1990 | Japan . |
| 7-303357 | 11/1995 | Japan . |
| 7-336919 | 12/1995 | Japan . |
| 8-205499 | 8/1996 | Japan . |
| 1114562 | 5/1968 | United Kingdom . |
| WO 91/14875 | 10/1991 | WIPO . |

OTHER PUBLICATIONS

X. Luo, et al., "Multiple Coupled Circuit Modeling of Synchronous Reluctance Machines", IEEE, 1994, pp. 281–282.

T. J. E. Miller, "Faults and Unbalance Forces in the Switched Reluctance Machine", IEEE Transactions on Industry Applications, vol. 32, No. 2, Mar./Apr. 1995, pp. 319–320.

Patent Abstracts of Japan, vol. 15, No. 387 (E–1117), Sep. 30, 1991, JP 03–155347, Jul. 3, 1991.

*Primary Examiner*—Nestor Ramirez
*Assistant Examiner*—Tran N Nguyen
*Attorney, Agent, or Firm*—Oblon, Spivak, McClelland, Maier & Neustadt, P.C.

[57] ABSTRACT

Directional electromagnetic steel plates are laminated, and a plurality of stator and rotor core segments are produced by generating into an approximate U-shape so as to provide a U-shaped cross section of the lamination. The direction of high magnetic permeability of the directional electromagnetic steel plates is aligned during lamination with the direction along said U-shape. The side portions of the U-shape adjoin each other and are arranged along the circumference to produce the stator and rotor cores. As the electromagnetic steel plates are laminated, fluctuation in the components in the circumferential direction of the magnetic flux within the magnetic poles and salient poles can be reduced, and iron loss can thus be lowered. In addition, the direction of high magnetic permeability of the directional electromagnetic steel plates coincides with the direction of the magnetic flux creating a much stronger magnetic flux.

3 Claims, 11 Drawing Sheets

5,994,814

RELUCTANCE MOTOR HAVING MAGNETIC POLES FORMED BY LAMINATING STEEL PLATES IN CIRCUMFERENTIAL DIRECTION

BACKGROUND OF THE INVENTION

1. Field of the Invention

The present invention relates to a reluctance motor, in which a rotor is so formed as to have portions having different magnetic permeabilities alternately located in the circumferential direction, therein creating the interaction with the magnetic field by the difference in the magnetic pearmeabilities, and the reluctance motor is rotated by this interaction.

2. Description of the Prior Art

FIG. 14 is an exploded view for explaining the operating principle of a reluctance motor. A magnetic pole 12 is formed in a stator 10, and a coil 13 is formed by winding conductors in concentration around a magnetic pole. An AC current of established phase is respectively supplied at the three phases of U, V and W to the corresponding portions of the coil 13, and the magnetic poles wound with respective coils are respectively excited by U, V and W phases. Hereinafter, when explaining the phases of a magnetic pole 12 and the coil 13 distinguishably, letters indicating the phase will be attached after each code for the purposes of explanation, such as magnetic pole 12-U and coil 13-U. At a rotor 16, two salient poles 18 are arranged for three magnetic poles 12-U, 12-V and 12-W of a stator. In the explanation hereinafter, if it becomes necessary to describe each salient pole separately from the others, then a hyphen and a number such as -1, -2 or -3 will be attached to each salient pole starting from the head of the rotating direction, as shown in the drawings.

When the phase is 0°, the magnetic poles 12-V and 12-W are excited, and magnetic flux is created between these 2 magnetic poles and salient poles 181- and 18-2 as shown by a dashed line on the drawings. At this time, an attractive force acts (shown by arrows on the drawings) between the magnetic pole 12-V and the salient pole 18-2, and the rotor 16 rotates clockwise. When the phase is 30°, the magnetic poles 12-U, 12-V and 12-W are excited, and the salient pole 18-2 facing the magnetic pole 12-V is located almost at the front, so that no torque is generated here and a torque is generated in other magnetic poles 12-U and 12-W. In this way, the rotor as a whole is rotated while the position of the magnetic flux sequentially created is changing.

In the reluctance motor described above, the relative position of the magnetic pole 12 and the salient pole 18 is deviated as the rotor 16 is rotated therefore, the direction of the magnetic flux inside the magnetic pole 12 and the salient pole 18 has a component in the circumferential direction, and even the magnitude of this component will vary. By this variation in the component in the circumferential direction, there was such a problem that the efficiency and the output could not be enhanced since iron loss increased. In other words, it was not possible to improve the compactness of the motor at all.

SUMMARY OF THE INVENTION

The present invention has been made to solve the problem as stated above and its object is to reduce the iron loss and provide a reluctance motor having compactness, a high efficiency and a high output.

To achieve the objects as stated above, the reluctance motor related to the present invention has a fixed portion core formed by a magnetic material, has a fixed portion for generating a shifting magnetic field and a moving portion core formed by a magnetic material; at a portion opposite to said fixed portion, part of the moving portion core is arranged along the moving direction of the shifting magnetic field at predetermined intervals, and has a moving portion moving as a result of the interaction with the shifting magnetic field. Moreover, at least one of the fixed portion core and the moving portion core has a pole laminated along the moving direction of the shifting magnetic field with grain oriented electromagnetic steel plates having magnetic permeability varying depending upon the direction, and the direction of the high magnetic permeability of the grain oriented electromagnetic steel plate within the pole coincides with the direction in which the fixed portion core is opposite to said moving portion core.

Since the magnetic flux cannot be generated easily in a direction through an electronic magnetic steel plate, a change in the moving direction component of a magnetic field of the magnetic flux in the pole can be reduced. By doing this, the occurrence of iron loss created by a change in magnetic flux can be restricted and accordingly the efficiency and output of a motor can be enhanced.

Also, since the direction of high magnetic permeability of the grain oriented electromagnetic steel plate coincides with the direction in which the fixed portion core is opposite to the moving portion core, the direction of the high magnetic permeability almost coincides with the direction of the magnetic flux generated. By doing this, the magnetic resistance of a polar portion becomes smaller, and the difference in magnetic permeability between the polar portion and other portions becomes larger. Therefore, the output of the motor can be enhanced.

Also, the core having the laminated pole with the grain oriented electromagnetic steel plates is formed by arranging the core segments, which were formed by laminating in such a manner that the lamination cross section of the grain oriented electromagnetic steel plates becomes almost a U-shape, along a moving direction of the shifting magnetic field so as to bring the segments into contact with each other, the direction of high magnetic permeability of the grain oriented electromagnetic steel plates is almost along the U-shape, and thus the pole can be formed at each side portion of the U-shape of neighboring core segments.

Also, a core having the pole having the grain oriented electromagnetic steel plates laminated is formed by arranging the core segments each consisting of two members formed back to back by laminating the grain oriented electromagnetic steel plates each having a J-shaped cross section in such a manner that the segments come into contact each other along the mobile direction of the shifting magnetic field, the direction of the high magnetic permeability of the grain oriented electromagnetic steel plates is along a shape which is like a J-shape, and the pole is formed by the portions of two sides of the J-shape united back to back.

Moreover, permanent magnets can be arranged between the poles. By doing this, torque can be increased by the interaction between the magnetic flux of the permanent magnets and the shifting magnetic field. That is, a motor can obtain a high output as well as a high efficiency and can also be made compact.

Also, according to other preferred embodiments of the present invention, a reluctance motor as described below may be provided. That is, this reluctance motor has a stator core formed by a magnetic material, a stator forming a rotating field, a rotor core formed by a magnetic material, a rotor rotating by the interaction with the rotating field, a part of the rotor core being arranged along the rotating direction of the rotating field with predetermined intervals at a portion being opposite to the stator, and moreover at least one of the stator core and rotor core having a pole laminated with the grain oriented electromagnetic steel plates having different magnetic permeability depending on the direction along the circumferential direction of the motor, and the direction of the high magnetic permeability of the grain oriented electromagnetic steel plates coincides with the radial direction of the motor.

Also, in this reluctance motor, permanent magnets can be arranged between the poles.

Also, the core having poles laminated with the grain oriented electromagnetic steel plates has core segments laminated in such a manner that the laminated cross section of the grain oriented electromagnetic steel plates becomes almost U-shape, which are formed by arranging them so as to bring them into contact with each other in the circumferential direction of the motor, the direction of the high magnetic permeability of the grain oriented electromagnetic steel plates is located along the U-shape, and the pole can be formed with one side of the U-shape of a neighboring core segment.

Also, a permanent magnet can be located in a valley portion of the U-shape.

Also, the core having laminated poles with the grain oriented electromagnetic steel plates is formed by arranging the core segments each consisting of two members formed back to back by laminating the grain oriented electromagnetic steel plates each having a J-shaped cross section in such a manner that said segments come into contact each other along the circumferential direction of the motor, the direction of the high magnetic permeability of the grain oriented electromagnetic steel plates is along a shape which is like a J-shape, and said pole is formed by the portions of two sides of the J-shape united back to back.

DESCRIPTION OF THE PREFERRED EMBODIMENT

Now the preferred embodiment of a reluctance motor related to the present invention will be explained in accordance with the drawings.

Figure 1:
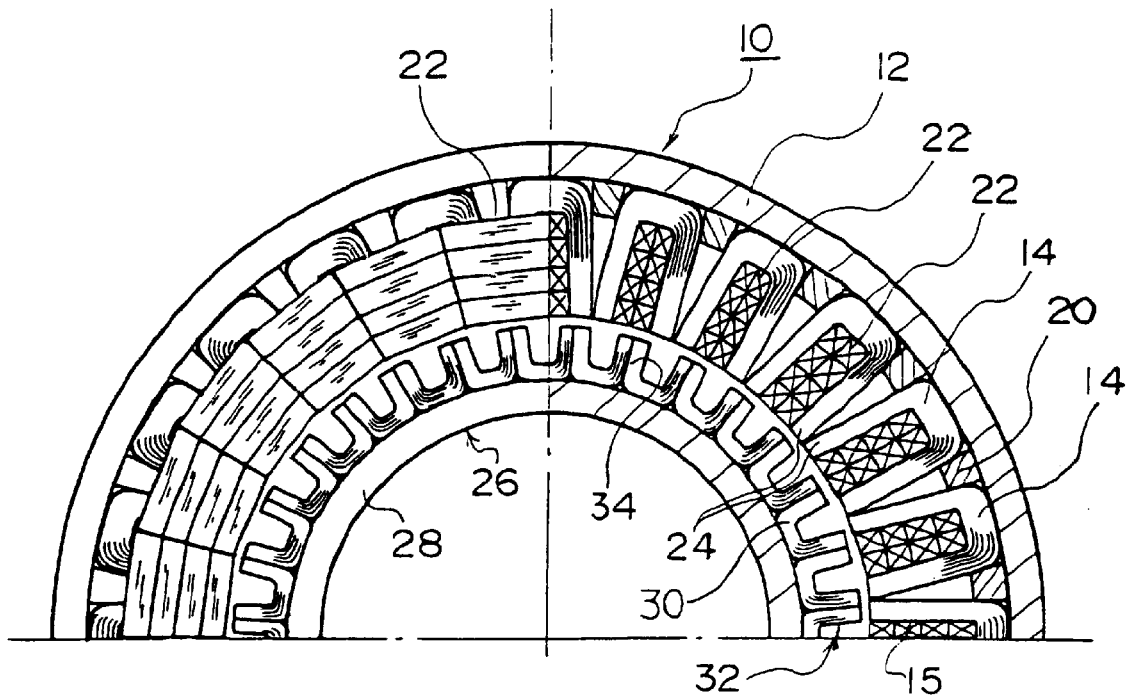
FIG. 1: approximate configuration showing the embodiment of the reluctance motor of the present invention.

FIG. 1 shows a side view and a cross-sectional construction of the reluctance motor of the preferred embodiment. A stator 10 has a stator core 15 at the inner side of a case 12 having an approximately cylindrical shape, which is formed by arranging a U-shaped stator core segment 14 in a circumferential direction. The stator core segment 14 has side portions 16 (refer to FIG. 2) facing the inner side, which is a U-shaped straight line portion, and a circular arc portion 18 (refer to FIG. 2) connecting these side portions 16 arranged by facing the outer side. Side portion 16 of two neighboring segments 14 are arranged side by side. In the embodiment, two side portions 16 of the stator core segment 14 are almost parallel to each other. When they are arranged in the circumferential direction, gaps are created at the outer side, so fixing pieces 20 are arranged for positioning the neighboring segments 14 as shown in the Figure. Also, conductors are wound in the U-shaped inner side portion of neighboring stator core segments 14 thereby forming a coil 22. Therefore, the side portion 16 at one side of the respective neighboring segments forms a pair of magnetic poles. In the case of this embodiment, 24 magnetic poles are formed.

The rotor 26 has a rotor core 32 wherein the U-shaped rotor core segments 30 are arranged in a circumferential direction around a cylindrical center member 28. The same as the case of stator core segment 14, the rotor core segments 30 have one side of each of two neighboring segments 30 place together, thereby forming a salient pole 34. In this preferred embodiment, 32 salient poles are provided in total.

Figure 2:
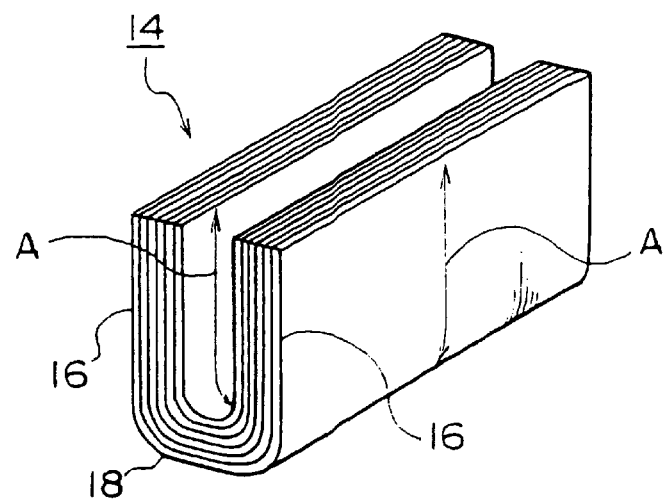
FIG. 2: detail of a core segment of this embodiment.

FIG. 2 shows an approximate configuration of the stator core segment 14. A stator core segment is made by laminating a plurality of directional electromagnetic steel plates, and its laminated cross section (surface at the left end in FIG. 2) is bent almost to the U-shape. Also, the direction of high magnetic permeability of the directional electromagnetic steel plates is aligned before lamination and the plates are bent into a U-shape along the direction of the high magnetic permeability. That is, the direction shown by an arrow A in FIG. 2 is the direction of high magnetic permeability.

As stated above, the electromagnetic steel plates are laminated, so that the magnetic flux in the magnetic pole 24 cannot be easily formed in the direction penetrating through the layer, and thus the components in the circumferential direction decrease. As stated previously, in the reluctance motor, the component in the circumferential direction of the magnetic flux within the magnetic pole tends to fluctuate, but the occurrence of components in a circumferential direction of magnetic flux can be restricted by laminating the electromagnetic steel plates. Therefore, iron loss due to eddy current loss and hysteresis loss caused by the fluctuations in the components in the circumferential direction can be decreased, and the efficiency of the motor can be enhanced. Also in the preferred embodiment, the direction of the high magnetic permeability of the directional electromagnetic steel plates can be aligned with the direction of the magnetic flux, so that the magnetic permeability in this direction can be enhanced compared to the case where the electromagnetic steel plates having no directivity is used. If the magnetic permeability is higher in the direction of the magnetic flux, stronger magnetic flux can be formed even though a current applied to the coil is the same. Therefore, the output can be increased.

Also in this embodiment, two side portions 16 of the stator core segment 14 are formed almost in parallel, but it is possible to tightly seal the side portions of neighboring segments 14 by widening the width of the one closer to the circular arc portion 18. In this case, the cross-sectional area of the inner side portion of the U-shape increases, so that more conductors can be wound. In this way, the output can be increased without increasing the outer shape of the motor.

Also, a rotor core segment 30 has a configuration almost the same as that of the stator core segment 14. that is, the directional electromagnetic steel plates are laminated by aligning their direction of magnetic permeability and are bent and formed so as to form a U-shape along the direction of the magnetic permeability. In this case, by laminating the electromagnetic steel plates, the component in the circumferential direction of the magnetic flux within the salient pole 34 can be decreased, so that iron loss created by the fluctuation in the component in the circumferential direction can be decreased. Also, the direction of the high magnetic permeability of the directional electromagnetic steel plates is aligned with the direction along the magnetic flux so that the difference in the magnetic permeability between the high magnetic permeability portion and the low magnetic permeability portion of the rotor can be increased. As described previously, the reluctance motor has a high magnetic permeability portion and a low magnetic permeability portion in the circumferential direction of the rotor, and a torque is generated by the difference in the magnetic permeability of these two portions. Therefore, by making the magnetic permeability of the high magnetic permeability portion higher, the difference in the magnetic permeability stated above can be made greater so that the output of the motor can be increased.

Figure 3:
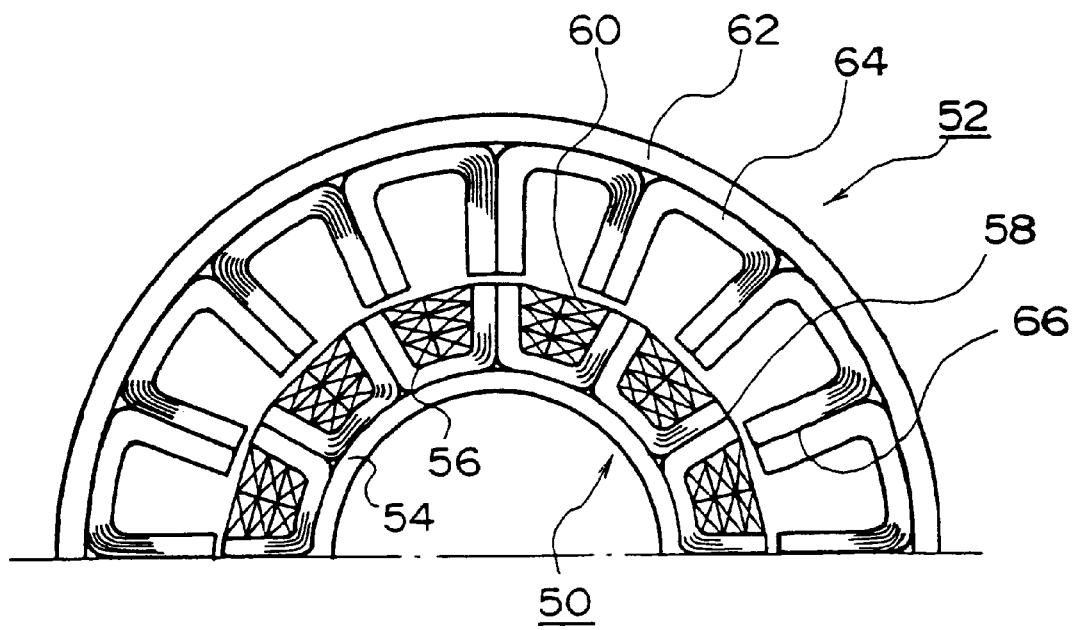
FIG. 3: approximate configuration showing another embodiment of the present invention.

FIG. 3 shows a section indicating an approximate configuration of another preferred embodiment of the reluctance motor related to the present invention. According to this embodiment, a stator 50 is formed at the inner side and a rotor 52 is formed at the outer side. The stator 50 has a stator core formed by arranging a U-shaped stator core segment 56 around a center member 54 which has an approximately cylindrical shape. One magnetic pole 58 is formed by one side portion of each neighboring segment 56 each having a U-shape, and a conductor is wound around the magnetic pole 58 thereby forming a coil. The stator core segment 56 has a configuration almost the same as that of the stator core segment 14 shown in FIG. 2. That is, directional electromagnetic steel plates are laminated and formed almost to a U-shape, and the direction showing the high magnetic permeability of steel plates is aligned with the direction of the magnetic generated (direction of an arrow A in FIG. 2).

On the other hand, a rotor 52 has a rotor core formed by arranging the U-shaped rotor core segments 64 at the inner side of a cylindrical case 62, and a salient pole 66 is formed by each side of two U-shaped side portions of the neighboring segments. The rotor core segment 64 has a configuration almost the same as that of the stator core segment 14 shown in FIG. 2. That is, directional electromagnetic steel plates are laminated almost to a U-shape, and the direction showing the high magnetic permeability of steel plates is aligned with the direction (direction of an arrow A in FIG. 2) in which the magnetic flux is generated.

A predetermined current is applied to the coil 60 and a magnetic pole 58 is excited, thereby generating a rotating magnetic field. The motor is rotated by the interaction between the rotating magnetic field and the rotor. In this preferred embodiment, only the layout of the stator and rotor is changed from that of the embodiment stated previously, and thus an identical effect can be created. That is, the occurrence of the components in the circumferential direction of the magnetic flux in the magnetic poles and salient poles can be suppressed, and therefore the iron loss created by the components in the circumferential direction can be decreased. Thus, the efficiency of the motor can be enhanced. In addition, the magnetic flux is formed along the direction of the high magnetic permeability of electromagnetic steel plates, and so this magnetic flux becomes much stronger and the output of the motor can be enhanced.

Figure 4:
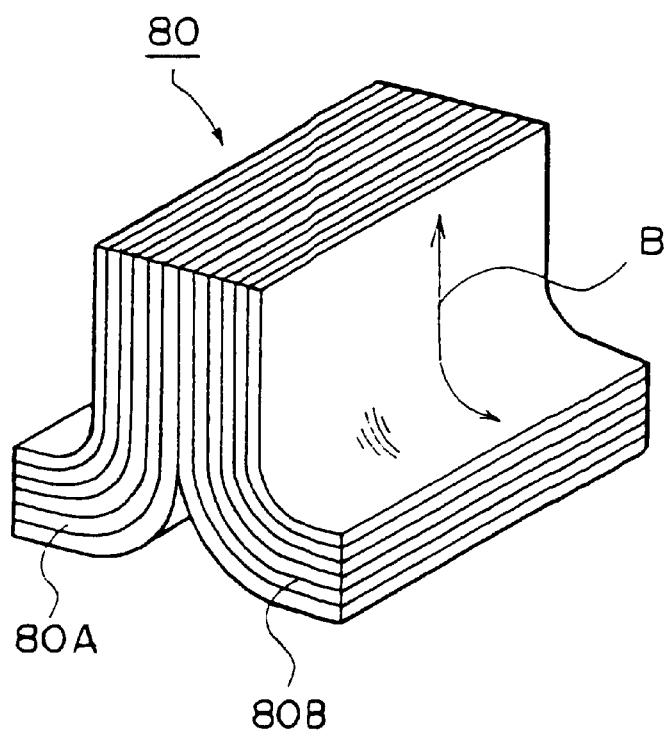
FIG. 4: detail of a core segment of another shape of this embodiment.

FIG. 4 shows another shape of the stator core segment. The stator core segment has a shape in which two members 80A and 80B which are nearly J-shaped are arranged back to back. Each of the J-shaped members 80A and 80B is formed by laminating the directional electromagnetic steel plates, and the direction of its high magnetic permeability coincides with the direction shown by an arrow in the Figure. If the stator core segments 80 are arranged in the circumferential direction, the same shape as that of the stator core 14 shown in FIG. 1 can be obtained, that is, the laminated electromagnetic steel plates having the U-shaped cross section of lamination will be laid out in the circumferential direction. Therefore, the same effect as that obtained from the embodiment shown in FIG. 1 can be created. Also, using the segment made by placing the two J-shaped members back to back, it is possible to form a rotor core 32 as shown in FIG. 1, and the same effect can be created. Of course, the same effect can be obtained if it is applied to a stator core or rotor core in the embodiment shown in FIG. 3.

Figure 5:
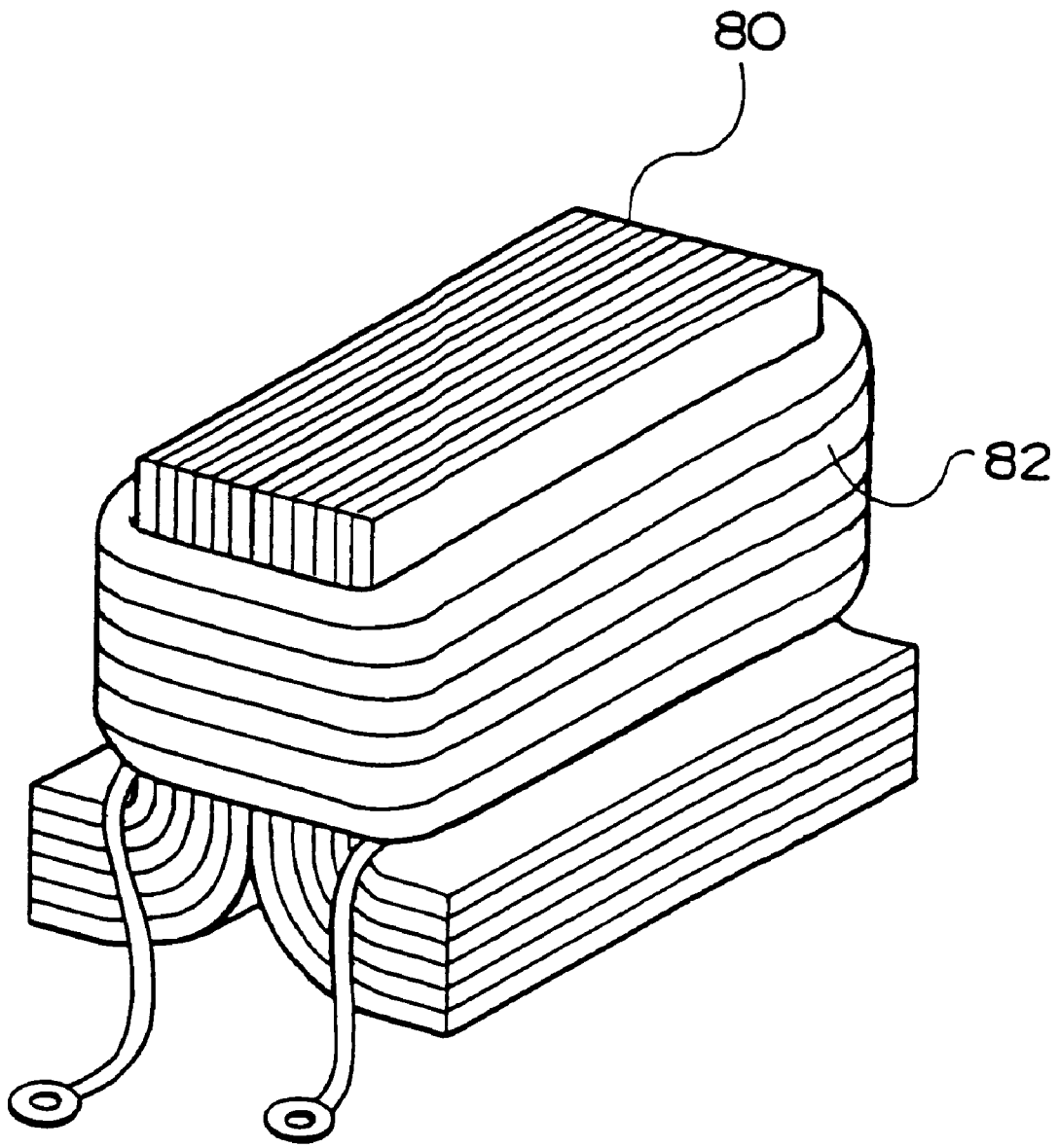
FIG. 5: drawing showing the state of the core segment formed with a coil shown in FIG. 4.

Moreover, in the case of stator core segment of the shape as shown in FIG. 4, a coil 82 can be formed by winding a conductor directly around the segment 80 as shown in FIG. 5 before arranging the segments. Thereafter, the segments with the coils formed can be laid out in the circumferential direction to form the stator core. In the case of a motor as shown in FIG. 1, forming a coil by winding a conductor at the inner surface side of the cylinder is a relatively difficult job, and there are many associated difficulties, even for automation. Particularly for automation, it is difficult to increase the number of turns for the conductor. That is, it is not possible to increase the percentage of occupancy, which is a ratio of a cross section of a space (or slot) where the conductors between magnetic poles can be housed to the sum of the cross sections of conductors housed in the space. However, if a conductor is merely wound around the divided segments as shown in FIG. 4, then the conductor can be wound easily at a high speed. Therefore, the man-hours of motor production can be reduced and the cost can be decreased.

In each preferred embodiment explained above, the cores used for both the stator and rotor are formed by the directional electromagnetic steel plates having a U-shaped laminated cross section, and a considerable effect may be obtained even though these are adopted only in one of the cores. Moreover, even the side portion 18 of the U-shape is formed by laminating the electromagnetic steel plates, in this case, the direction of the magnetic flux tends to fluctuate easily at the poles (magnetic poles and salient poles) of the core, so that a considerable effect can be obtained by laminating only this circular arc portion with a configuration which makes each electromagnetic steel plate parallel to the motor shaft.

Figure 6:
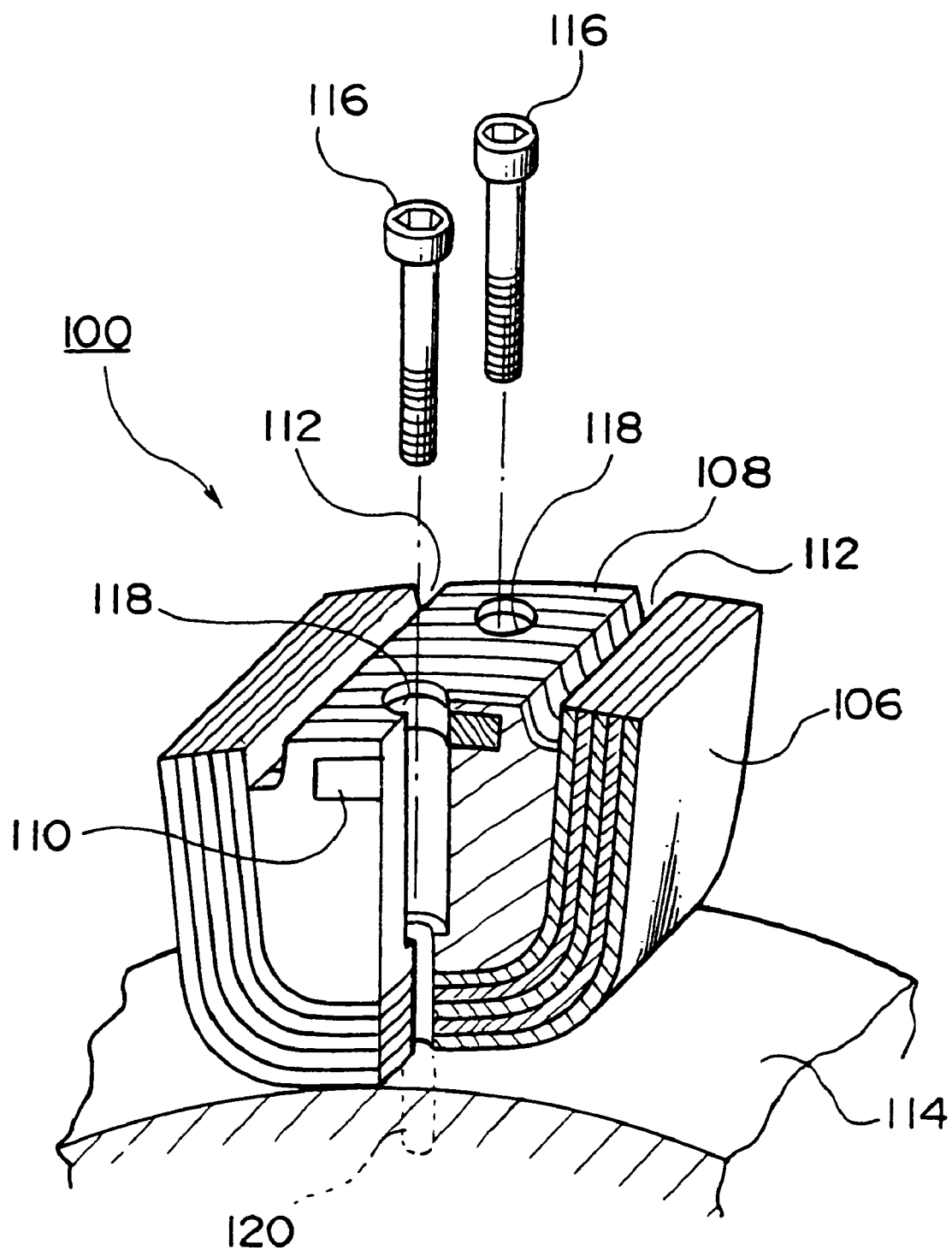
FIG. 6: detail of a rotor core segment of another embodiment of the present invention.
Figure 7:
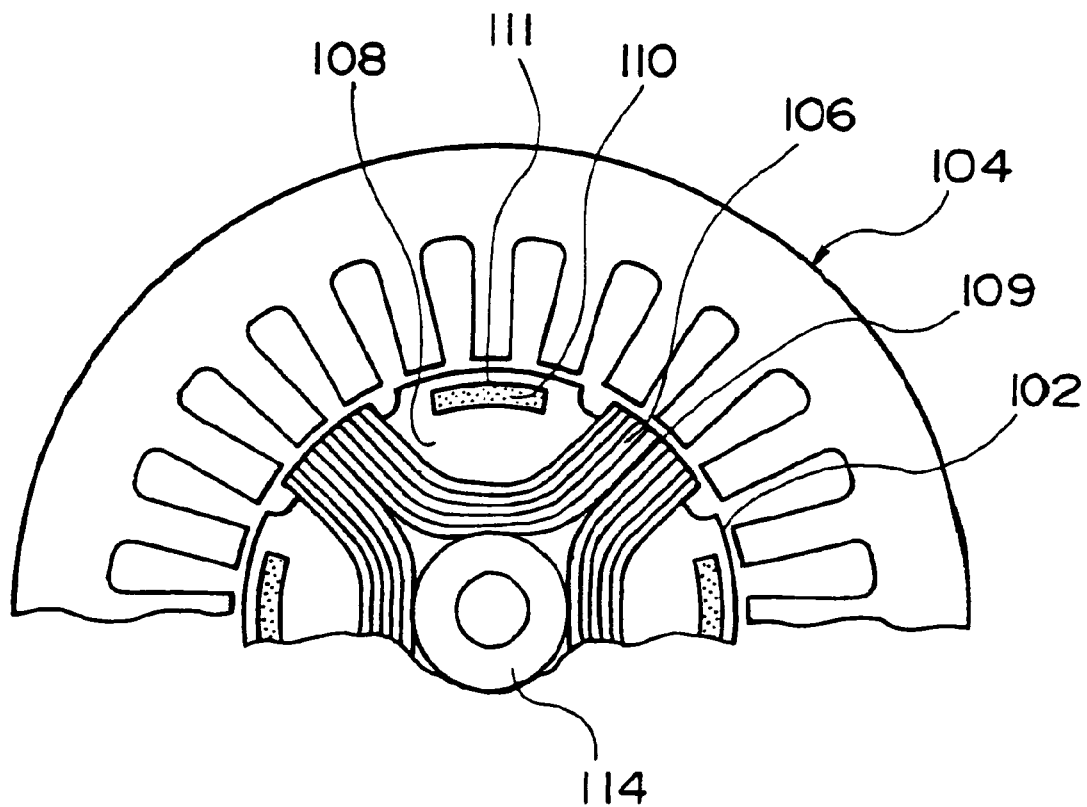
FIG. 7: approximate configuration of a motor formed by a rotor core segment shown in FIG. 6.

In FIGS. 6 and 7, another preferred embodiment of the reluctance motor related to the present invention is shown. This embodiment featured the arrangement of permanent magnets in the rotor. FIG. 6 shows a rotor segment 100 with one portion broken and, as shown in FIG. 7, a rotor 102 is formed by arranging the rotor core segments 100 in the circumferential direction. In the vicinities of the rotor 102, a stator 104 is arranged for forming the rotating magnetic field.

The rotor core segment 100 has a reluctance core 106 formed by laminating a plurality of the directional electromagnetic steel plates and then bending them until the cross section of the lamination becomes a U-shape as well as a magnet core 108 formed in the valley portion of the U-shape of the reluctance core 106. The reluctance core 106 is, similarly to the stator core segment 14 or rotor core segment 30 as shown in FIG. 2, laminated by aligning the direction of the high magnetic permeability of the directional electromagnetic steel plates. Further, it is bent into a U-shape along this direction, and the side portions of the reluctance core 106 of the neighboring rotor core segment 100 are combined as a pair, thereby forming one salient pole 109. This salient pole 109 is equivalent to the salient pole 34 shown in FIG. 1.

The magnet core 108 is made by laminating non-directional electromagnetic steel plates in the direction of the motor shaft and welding the bottom portion in the direction of motor shaft. When it is formed as a rotor 102, permanent magnets 110 are embedded and arranged in the vicinities of its outer periphery. A tip portion of this magnet core 108 functions as a hard magnetic pole 111. Electromagnetic steel plates are laminated in the magnet core 108 in order to restrict the eddy current created inside the rotor core as a result of changes in magnetic field formed by a stator. Also, a groove 112 is formed between the tips of the outer periphery of the magnet core 108 and the reluctance core 106, the magnetic flux of the permanent magnet 110 cannot pass through the stator core because of the presence of the groove 112, and its direct leakage to the reluctance core 106 is restricted.

The rotor core segment 100 is tightened at the outer periphery of the center member 114 with hexagon socket head cap screws 116. That is, for a rotor core segment 100, a hexagon socket head cap screw 116 is inserted into a stepped through-hole 118 provided in the segment, and a threaded portion of said screw is screwed to a tapped hole 120 of the center member thereby fixing the rotor core segment 100. The stepped through hole 118 can even be a square hole and, in this case, the kinds of press dies for punching the non-directional electromagnetic steel plates can be reduced. Also, after tightening the hexagon socket head cap screw, loosening of the screw is prevented by filling and hardening a resin material.

In a motor having a rotor 102 formed as stated above, a torque based on the interaction between the magnetic field generated by the stator 104 and hard magnetic pole 111 formed by a permanent magnet 110 is generated in addition to the torque by the action of salient pole 109 formed by the reluctance core 106. Torque by the salient pole 109 is generated based on the nonuniformity of the reluctance formed in the circumferential direction of the rotor. That is, a force pulling a portion having a high reluctance by the magnetic field formed by the stator 104 becomes a torque which rotates the rotor 102. At this time, similarly to the embodiment shown in FIG. 1, the changes in the components in the circumferential direction of the magnetic flux in the pole of the reluctance core 106 can be reduced so that the occurrence of iron loss can be restricted.

Also, the torque generated by the hard magnetic pole 111 becomes a torque which rotates the rotor 102 by means of an attracting force and a repulsive force acting to the hard magnetic pole 111 against the magnetic field formed by the stator. As stated above, both the torque generated by the reluctance and the torque generated by the hard magnetic pole 111, which is a permanent magnet, are generated and thus a compact motor having a high output can be obtained.

Figure 8:
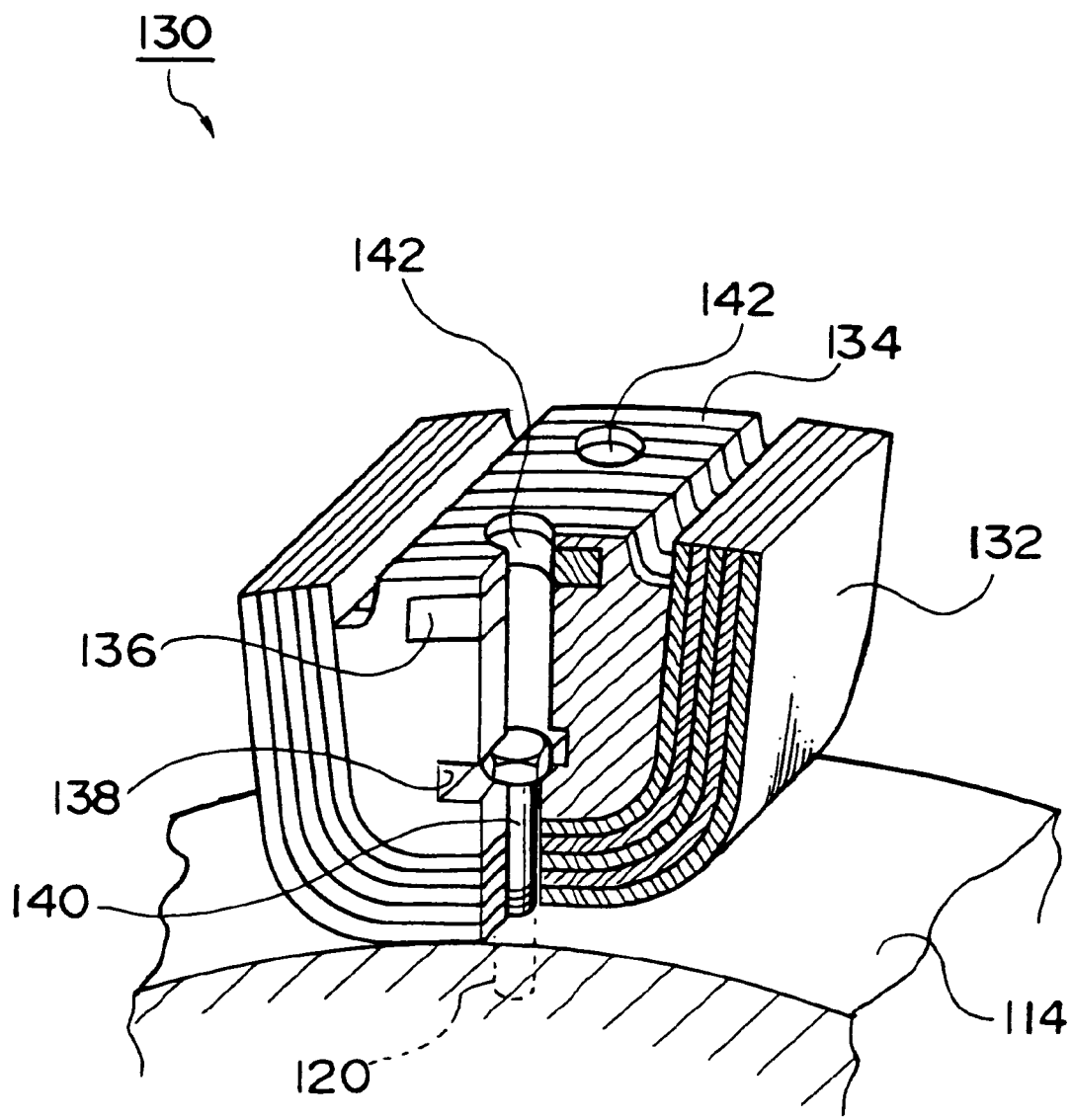
FIG. 8: detail of another embodiment of the rotor core segment.

FIG. 8 shows an embodiment in which the attaching method for the rotor core segment is different from that shown in FIGS. 6 and 7. The rotor core segment 130 has a reluctance core 132 bent and formed to a U-shaped cross section of lamination by laminating a plurality of the directional electromagnetic steel plates, and a magnet core 134 formed in the valley portion of the U-shape of the reluctance core 132. The reluctance core 132 is, similarly the stator core segment 14 or rotor core segment 30 as shown in FIG. 2, laminated by aligning the direction of the high magnetic permeability of the directional electromagnetic steel plates and is further bent to the U-shape along this direction. For the magnet core 134, the non-directional electromagnetic steel plates are laminated in the direction of the motor shaft and a permanent magnet 136 is embedded and arranged near its outer periphery. Similarly to the embodiment shown in FIGS. 6 and 7, the rotor core segment 130 is arrayed in the circumferential direction of the rotor and the salient pole and the hard magnetic pole are alternately arranged.

The difference between the rotor core segment 100 shown in FIG. 6 and the rotor core segment 130 shown in FIG. 8 is their attaching method. In the rotor core segment 130, an opening is located at the bottom in contact with its center member 114, and a T-shaped slot 138 extending to the motor shaft direction is provided. The T-shaped slot 138 is provided throughout the full length of a rotor core segment 130 in the axial direction of the motor.

At the time of attaching the rotor core segment 130, a hexagon headed bolt 140 is screwed to a tapped hole 120 provided in the center member 114, the center member 114 and the rotor core segment 130 are subjected to relative displacement in the motor shaft direction and are matched to the normal position while engaging the hexagon headed bolt 140 to a T-shaped slot 138. Thereafter, the hexagon headed bolt 140 is tightened from a bolt tightening hole 142, the rotor core segment 130 is fixed to the center member 114, and a resin material is filled and hardened for preventing the hexagon head bolt from loosening. The configuration other than those points described above is the same as the configuration of the embodiment shown in FIG. 6, and the performance of the motor of this embodiment is able to achieve almost the same effect as that of the embodiment shown in FIGS. 6 and 7.

Figure 9:
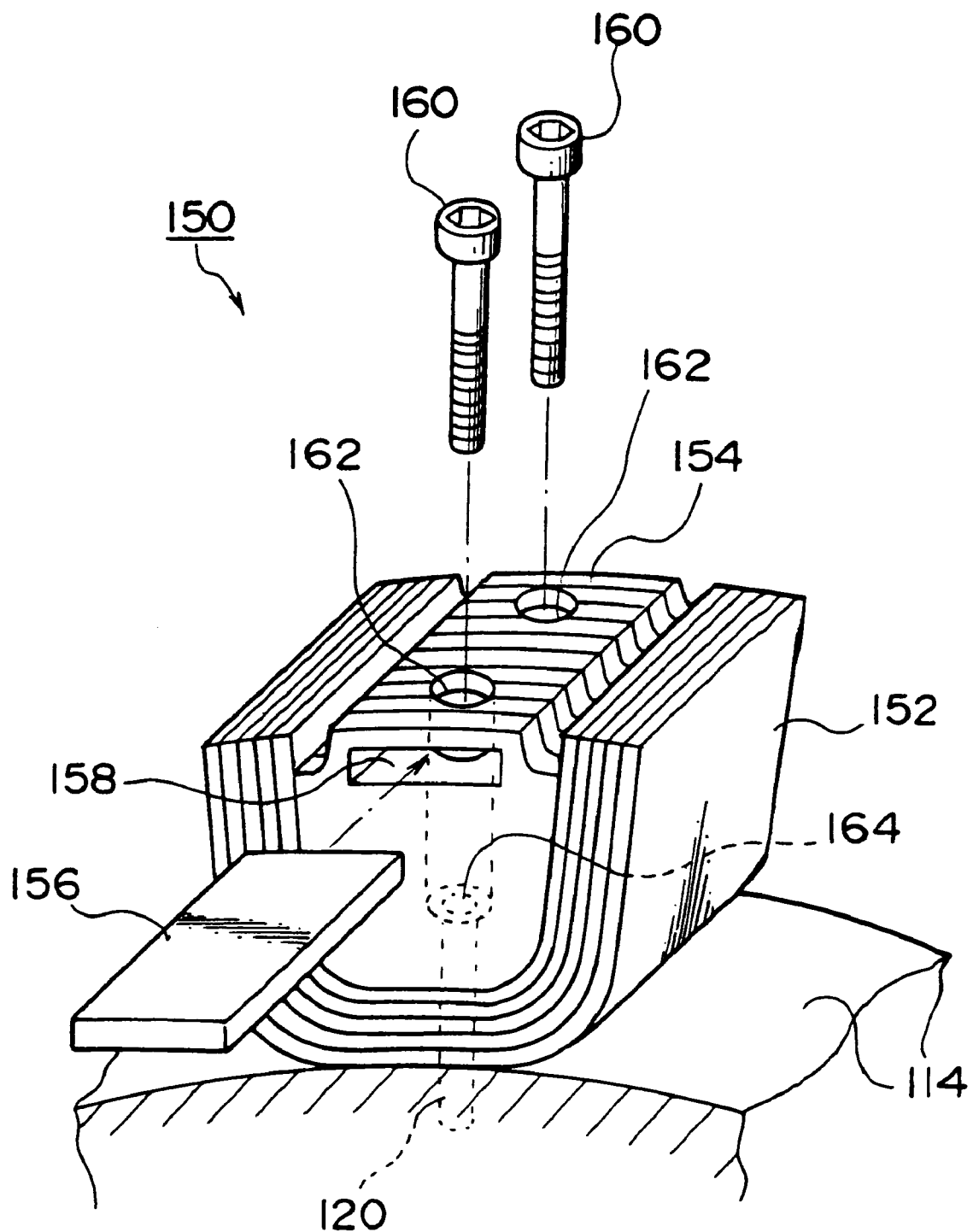
FIG. 9: detail of another embodiment of the rotor core segment.

Moreover, FIG. 9 shows another embodiment in which the attaching method for the rotor core segment is further different from that of the embodiment shown in FIGS. 6 and 7. The rotor core segment 150 has a reluctance core 152 bent and formed by laminating a plurality of directional electromagnetic steel plates in such a manner that the cross section of the lamination becomes a U-shape and a magnet core 154 formed in a U-shaped valley portion of the reluctance core 152. The reluctance core 152 is laminated by aligning the direction of the high magnetic permeability of the grain oriented magnetic steel plates and further bent to a U-shape along this direction similarly to the stator core segment 14 or rotor core segment 30 as shown in FIG. 2. The magnet core 154 has an embedding hole 158 for embedding a permanent magnet 156 near its outer periphery when the non-directional electromagnetic steel plates are laminated in the direction of a motor shaft and formed as a rotor. By embedding a permanent magnet 156 in the embedding hole 158, the rotor segments 150 are arrayed in the circumferential direction of the rotor similarly to the embodiment shown in FIGS. 6 and 7, and the salient pole and the hard magnetic pole are arranged alternately.

The mounting method for a permanent magnet is different between the rotor core segment 100 shown in FIG. 6 and the rotor core segment 150 shown in FIG. 9. In the rotor core segment 150, after it is fixed to the center member 114, the permanent magnet 156 is mounted to the relevant rotor core segment 150, that is, the rotor. To explain in more detail, a hexagon socket head cap screw 160 is first inserted into a stepped through-hole 162 of the rotor core segment 150 in a state where the permanent magnet 156 has not been mounted, and the threaded portion of the hexagon socket head cap screw 160 is screwed to a tapped hole 120 of the center member 114. A stepped portion 164 of the stepped through-hole 162 is formed to a sufficiently deep position so that the head portion of the hexagon socket head cap screw will not be projected out to the embedding hole 158. Also, similarly to the example stated above, a resin material is filled and hardened for preventing the bolt from loosening. In a manner as stated above, the rotor core segment 150 is tightened and fixed to the center member 114.

Now, as shown in the drawings, the permanent magnet 256 is inserted from the motor shaft direction into the embedding hole 158 and, in this way, the permanent magnet 156 is mounted to the rotor. In the case of this embodiment, it is not required to make holes for inserting the bolts into the permanent magnet 156 or for tightening the bolts, and accordingly, the magnetic force generated from the hard magnetic pole can be increased. Therefore, the torque generated by the interaction between the magnetic field formed by the stator and the hard magnetic pole, that is, the permanent magnet, can be increased compared to the cases shown in FIG. 6 and FIG. 8. Therefore, a compact and high-output motor can be obtained compared to the cases of embodiments described hereinbefore. Also, the configuration of the reluctance core 152 is the same as the embodiments shown in FIG. 6 and others. Therefore, this embodiment is able to create the same effect as those of the embodiments shown in FIG. 1 and FIG. 6.

Figure 10:
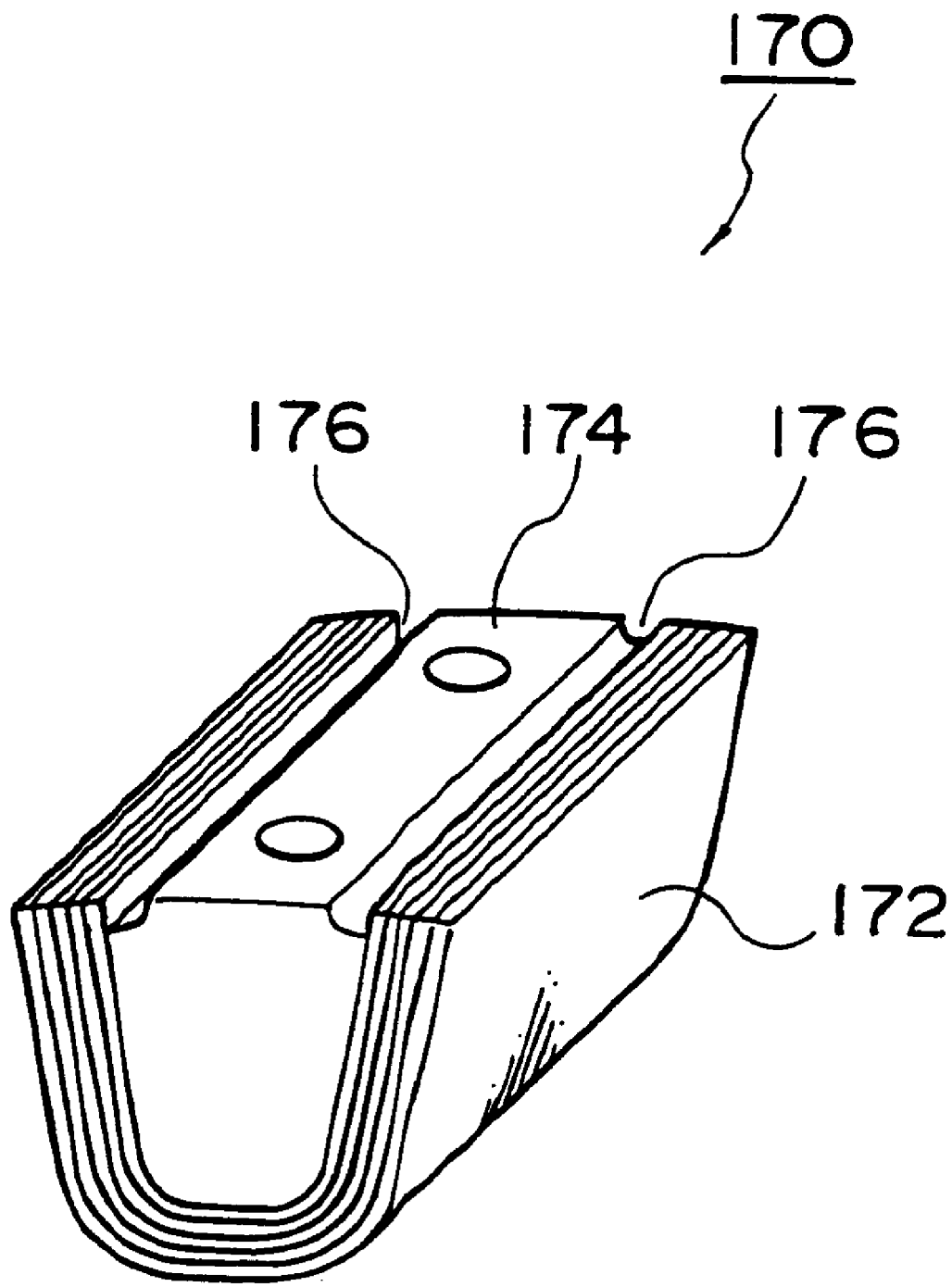
FIG. 10: detail of another embodiment of the rotor core segment.
Figure 11:
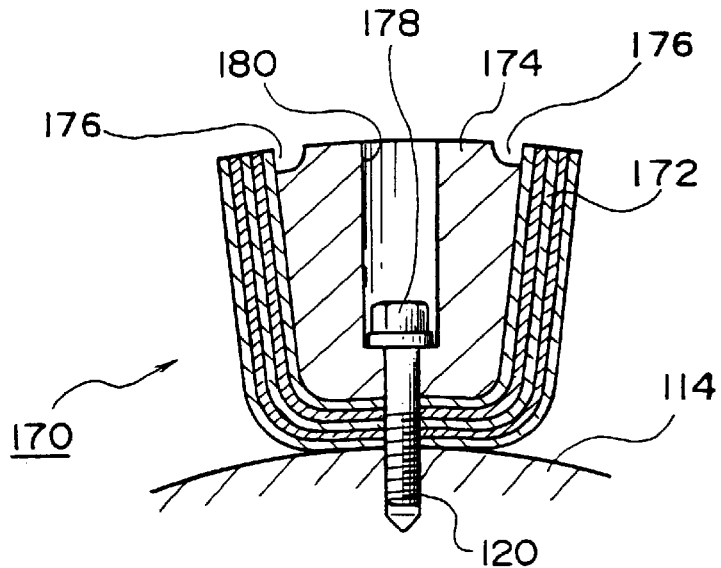
FIG. 11: drawing explaining the fixing method for the rotor core segment shown in FIG. 10.
Figure 12:
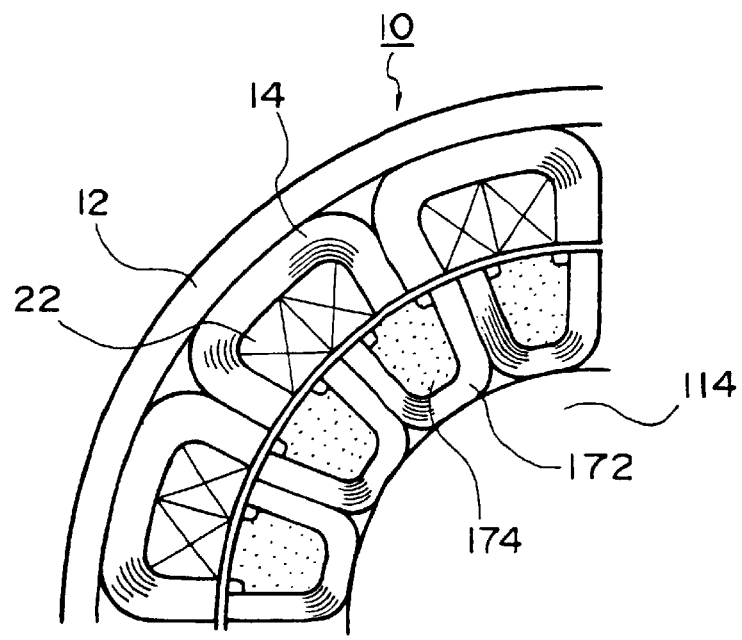
FIG. 12: approximate configuration of a motor formed by the rotor core segment shown in FIG. 10.

FIG. 10 through FIG. 12 show another embodiment of the reluctance motor related to the present invention. In this embodiment, the configuration of a magnet core is different compared to the embodiment shown in FIG. 6.

As shown in FIG. 10, the rotor core segment 170 has a reluctance core 172 bent and formed so as to create a U-shaped cross section of the lamination and a magnet core 174 formed in a valley portion of the U-shape of the reluctance core 172. The reluctance core 172 is laminated by aligning the direction of the high magnetic permeability of the directional electromagnetic steel plates similarly to the stator core segment 14 or rotor core segment 30 as shown in FIG. 2. The magnet core 174 is formed with a permanent magnet having the same shape as that of the magnet core 108 comprising magnetic steel plates laminated with the permanent magnet shown in FIG. 6. A groove 176 is formed the same as the groove 112 of FIG. 6 between the outer periphery of this magnet core 174 and the outer periphery of the reluctance core 172. Similarly to the case of the groove 112, the magnetic flux, which does not interlink with the stator core among the magnetic flux generated by the permanent magnet of the magnet core, is decreased.

As shown in FIG. 11, the rotor core segment 170 is fixed to a tapped hole made on the circumference of the center member 114 by a hexagon socket head cap screw 178, and the loosening of the bolt is prevented by a resin material similarly the example as stated above. Because of this, the rotor segment 170 has a stepped hole 180 equivalent to the stepped hole 118 shown in FIG. 6. A hexagon socket head cap screw 178 is inserted into the stepped hole 180 and is screwed to the threaded portion 120.

As stated above, a plurality of rotor core segments 170 are arranged on the center member 114 in the circumferential direction of the rotor, and the salient poles and hard magnetic poles are alternately arranged, and a motor as shown in FIG. 12 is formed. The stator in FIG. 12 has a configuration the same as that of the stator 10 in FIG. 1, and the same reference numerals are attached for each component and thus its explanation will be omitted here.

In this embodiment, the valley portion of the reluctance core 172 is embedded with a permanent magnet, and the volume of the permanent magnet increases compared to the embodiment shown in FIG. 6, and thus a larger magnetic flux can be generated. Thus, among the torque generated by the reluctance core and the torque generated by the magnet core, the latter can be made larger and more compact, thereby creating a high-output motor. Also, the configuration of the reluctance core 172 is the same as the embodiment as shown in FIG. 6. Therefore, this embodiment is able to create the same effects related to the reluctance core as the embodiment shown in FIG. 1 and the embodiment shown in FIG. 6.

Figure 13:
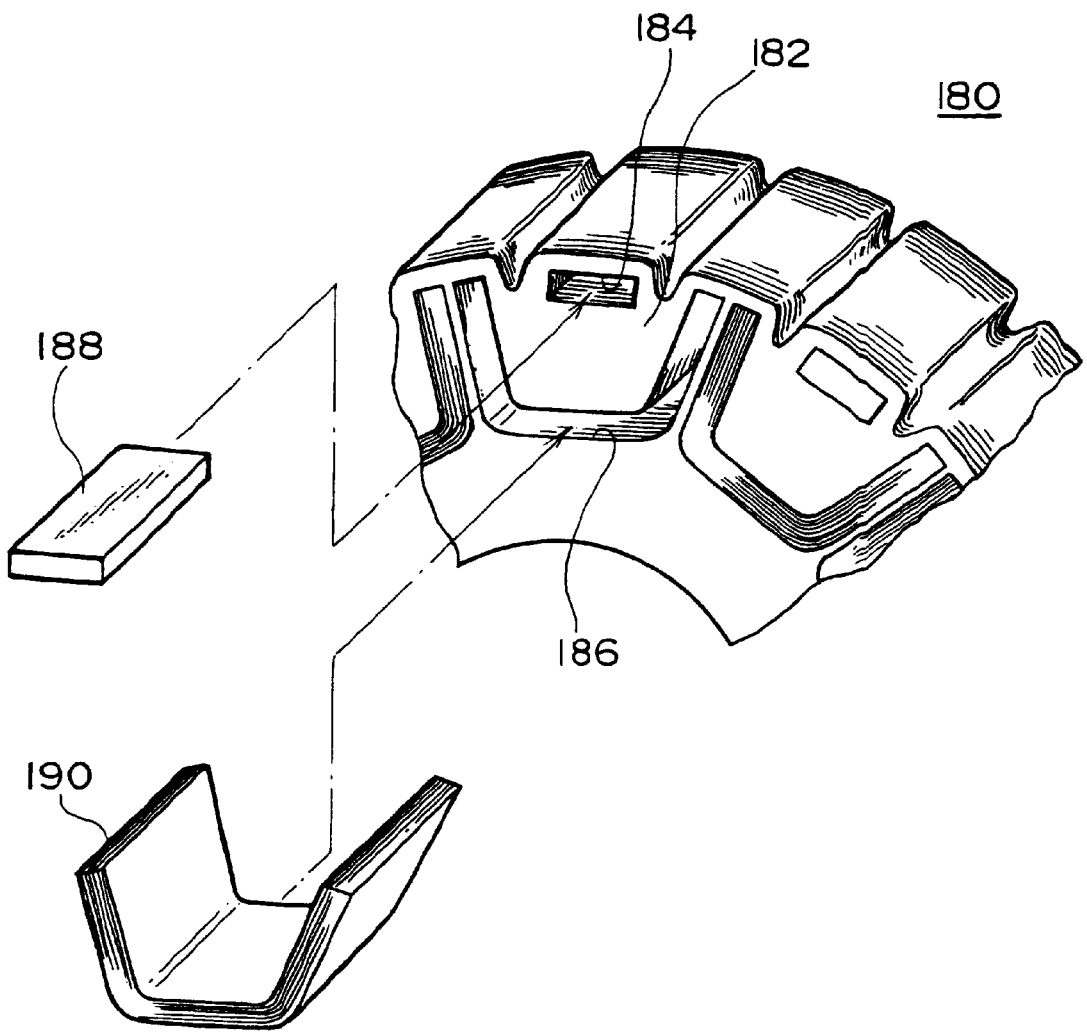
FIG. 13: detail of another embodiment of the rotor core.
Figure 14:
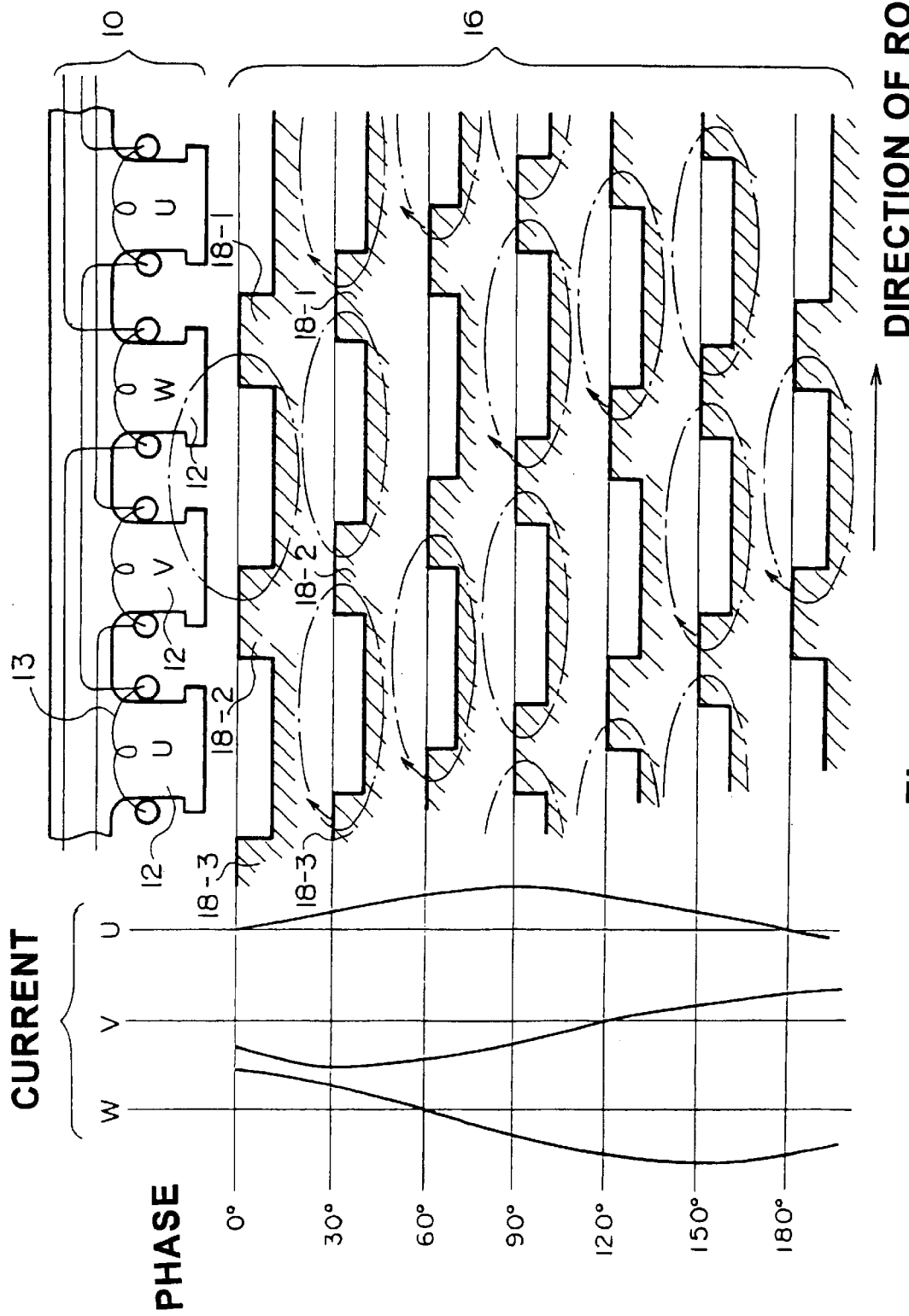
FIG. 14: drawing explaining the operating principle of a reluctance motor.

FIG. 13 also shows another embodiment. In this embodiment, the rotor core 180 is not divided into the segments as is done in the embodiment described previously and is made in one integrated body. The rotor core 180 is formed by laminating a plurality of circular ring-shaped non-directional electromagnetic steel plates 182 in the axial direction of the rotor. Two kinds of embedding holes 184 and 186 are drilled in the magnetic steel plates 182. One embedding hole 184 is provided to be positioned near the outer periphery of the rotor core 180 and has a rectangular shape, while the other embedding hole 186 has a U-shape and is arranged in such a manner that both ends of the U-shape will face the outer side of the radius direction at the outer peripheral portion of the rotor core 180. After the magnetic steel plates 182 are laminated, an approximately rectangular permanent magnet 188 is inserted into the embedding hole 186 and fixed. In addition, a reluctance core 190 having the same U-shaped sectional shape is inserted into the embedding hole 186. The reluctance core 190 is laminated by aligning the direction of the high magnetic permeability of the direction electromagnetic steel plates similarly to the stator core segment 14 or rotor core segment 30 as shown in FIG. 2 and further bent into a U-shape along this direction.

Within the embedding holes 184 and 186, the salient poles and the hard magnetic poles are arranged in the circumferential direction of the rotor similarly the embodiment shown in FIGS. 6 and 7 by embedding the permanent magnet 188 and the reluctance core 190.

In the case of this embodiment, holes for inserting the bolts into the permanent magnet 188 and reluctance core 190 or holes for tightening the bolts are not required, and accordingly, the torque generated by the hard magnetic poles and the torque generated by the reluctance can be made larger. Therefore, a high output motor with a smaller size can be produced.

What is claimed is:

1. A reluctance motor, comprising:
   a stator including a stator core having a magnetic material and configured to form a rotating magnetic field; and a rotor including a rotor core assembly having a magnetic material and configured to move by means of interaction with the rotating magnetic field, said rotor core assembly further including:

a rotor core formed by laminating steel plates along a rotor axis and including first and second holes, the first hole being a U-shaped hole extending in a direction of the rotor axis and having a U-shaped cross section, the second hole being positioned at a valley portion defined by the U-shaped first hole and having a generally rectangular cross section, a reluctance core having approximately a same cross section as that of the U-shaped first hole and inserted into the U-shaped hole, the reluctance core being formed by laminating directional electromagnetic steel plates, a magnetic permeability of the directional electromagnetic steel plates being along the U-shaped hole, and a permanent magnet having approximately a same cross section as that of the generally rectangular cross section of the second hole and inserted into the second hole.

2. A reluctance motor, comprising:

a fixed section including a fixed section core having an electromagnetic material and configured to form a moving magnetic field; and a moving section including a moving section core having an electromagnetic material and configured to move by means of interaction with the moving magnetic field;

wherein:

portions of the moving section core are arranged in a moving direction of the moving magnetic field such that said portions oppose the fixed section and have a predetermined interval between adjacent portions, at least one of the fixed section core and the moving section core comprise poles where directional electromagnetic steel plates are laminated in the moving direction of the moving magnetic field, a direction of high magnetic permeability of the directional electromagnetic steel plates at the poles coincides with a direction in which the fixed section core and the moving section core oppose each other, said at least one of the fixed section core and the rotor section core having the poles where the directional electromagnetic steel plates are laminated includes core segments arranged contacting adjacent core segments in the moving direction of the moving magnetic field, the core segments each being formed by laminating the directional electromagnetic steel plates such that a cross section of said each core segment in a lamination direction is of a substantially U shape, the direction of high magnetic permeability of the directional electromagnetic steel plates extends along the substantially U shape, the poles comprising two adjoining sides of contacting core segments, and one of the fixed section and the moving section includes a permanent magnet in a valley part of the substantially U shape, and the other one of the fixed section and moving section includes a coil in a valley part of the U shape.

3. The reluctance motor as defined in claim 2, wherein said valley part of the one of the fixed section and the moving section is substantially filled with said permanent magnet.

* * * * *